United States Patent [19]
Binns

[11] 4,312,613
[45] Jan. 26, 1982

[54] BLIND RIVET ASSEMBLY

[76] Inventor: Lloyd S. Binns, 10220 Warner Ave., Apt. E, Fountain Valley, Calif. 92708

[21] Appl. No.: 204,170

[22] Filed: Nov. 5, 1980

Related U.S. Application Data

[63] Continuation-in-part of Ser. No. 37,635, May 11, 1979, abandoned.

[51] Int. Cl.³ .............................................. F16B 13/06
[52] U.S. Cl. ......................................... 411/34; 411/43
[58] Field of Search .................... 411/34, 38, 43, 44, 411/361; 10/27 R, 27 E

[56] References Cited

U.S. PATENT DOCUMENTS

| | | | |
|---|---|---|---|
| 2,030,166 | 2/1936 | Huck | 411/34 X |
| 2,887,003 | 5/1959 | Brilmyer | 411/34 |
| 3,107,572 | 10/1963 | Orloff | 411/34 |
| 3,236,143 | 2/1966 | Wing | 411/34 |
| 3,390,601 | 7/1968 | Summerlin | 411/43 |
| 4,089,247 | 5/1978 | Dahl et al. | 411/34 |
| 4,127,345 | 11/1978 | Angelosanto et al. | 411/354 X |
| 4,137,817 | 2/1979 | Siebol | 411/43 |

*Primary Examiner*—Ramon S. Britts
*Attorney, Agent, or Firm*—Spensley, Horn, Jubas & Lubitz

[57] ABSTRACT

A blind rivet assembly is disclosed. The rivet assembly comprises a mandrel, a rivet body, a buckling sleeve and a locking collar. The sleeve, rivet body and collar are slideably disposed about the mandrel with said buckle sleeve disposed adjacent one end of the body and the mandrel extending through the body and beyond the other end of the body. The buckle sleeve has a generally cylindrical configuration such that when subjected to a pulling force, the sleeve buckles outwardly from the mandrel, slides about the rivet body and engages a work piece.

20 Claims, 23 Drawing Figures

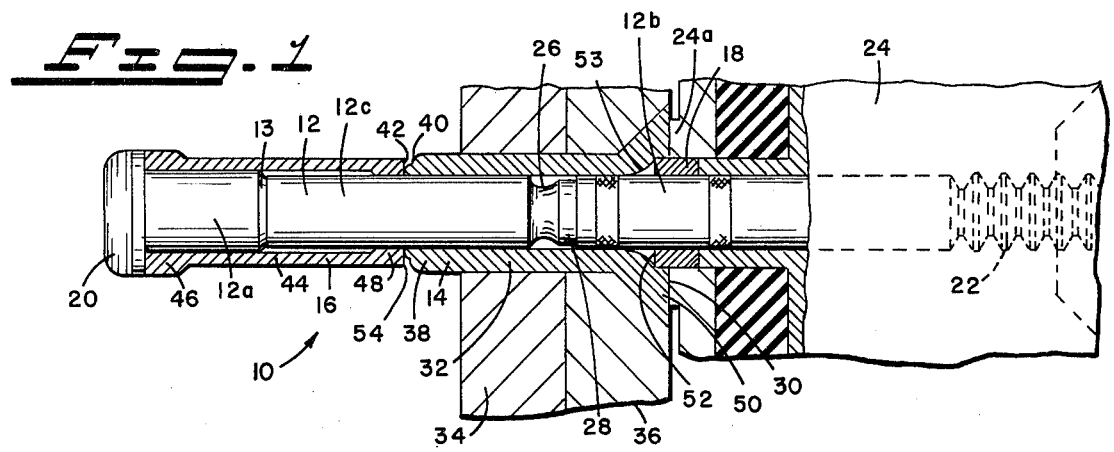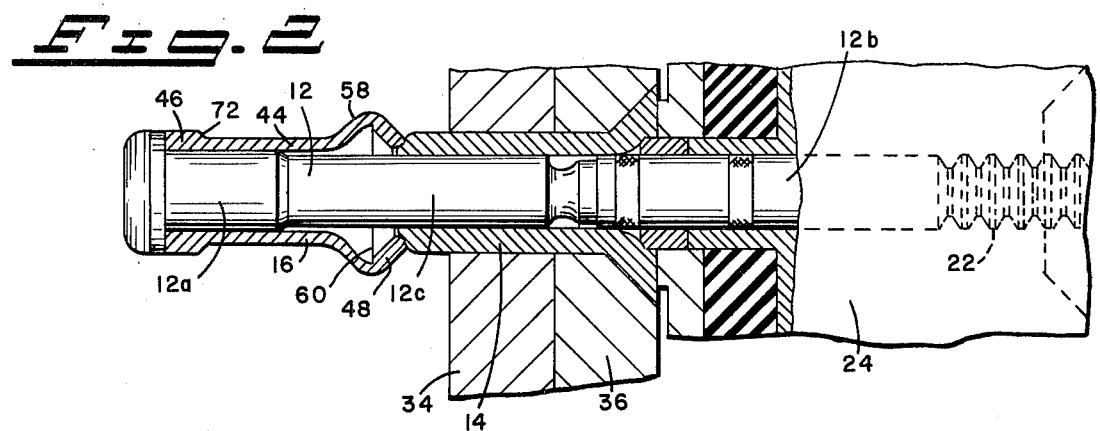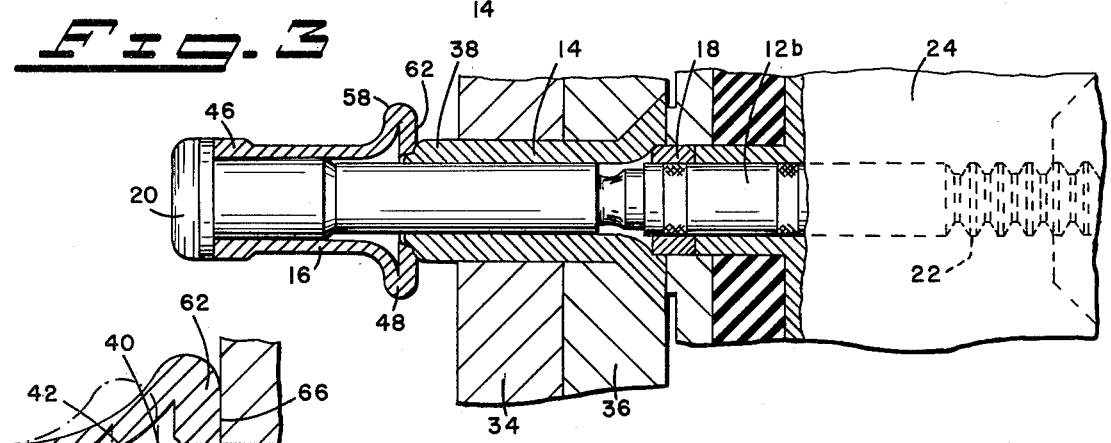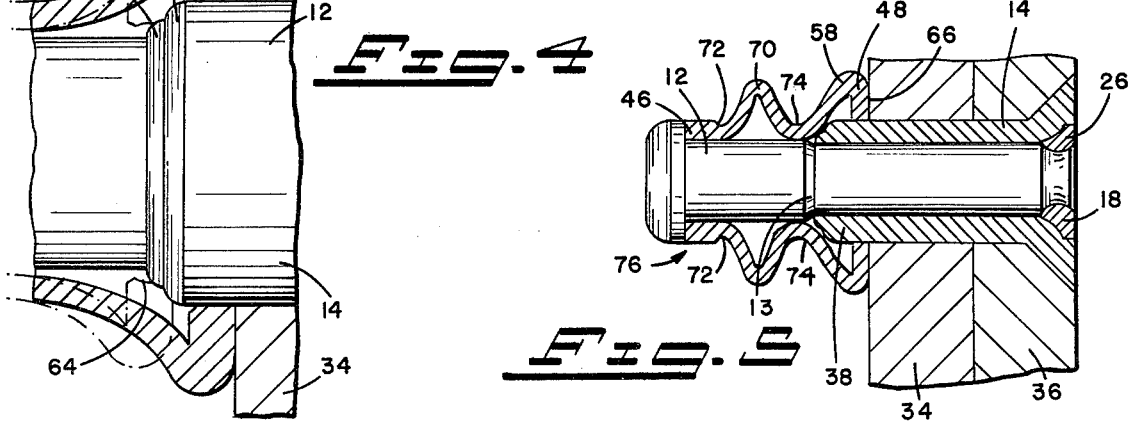

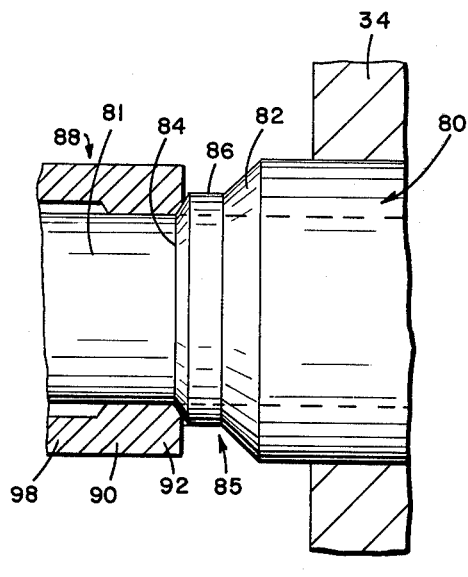
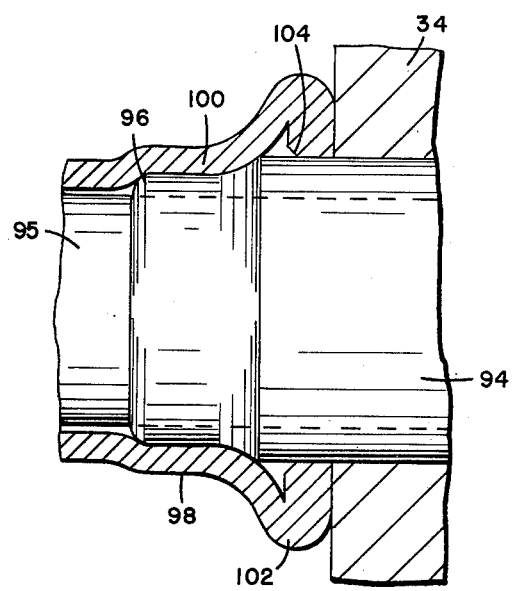
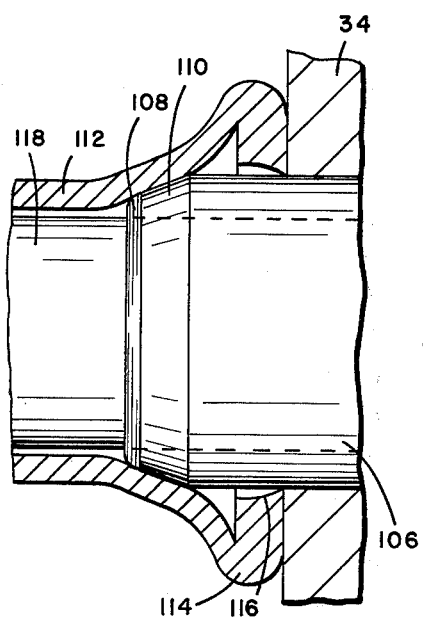
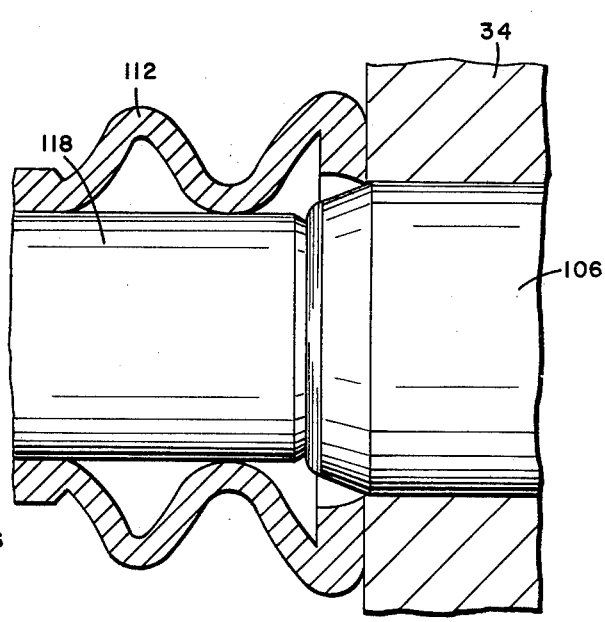

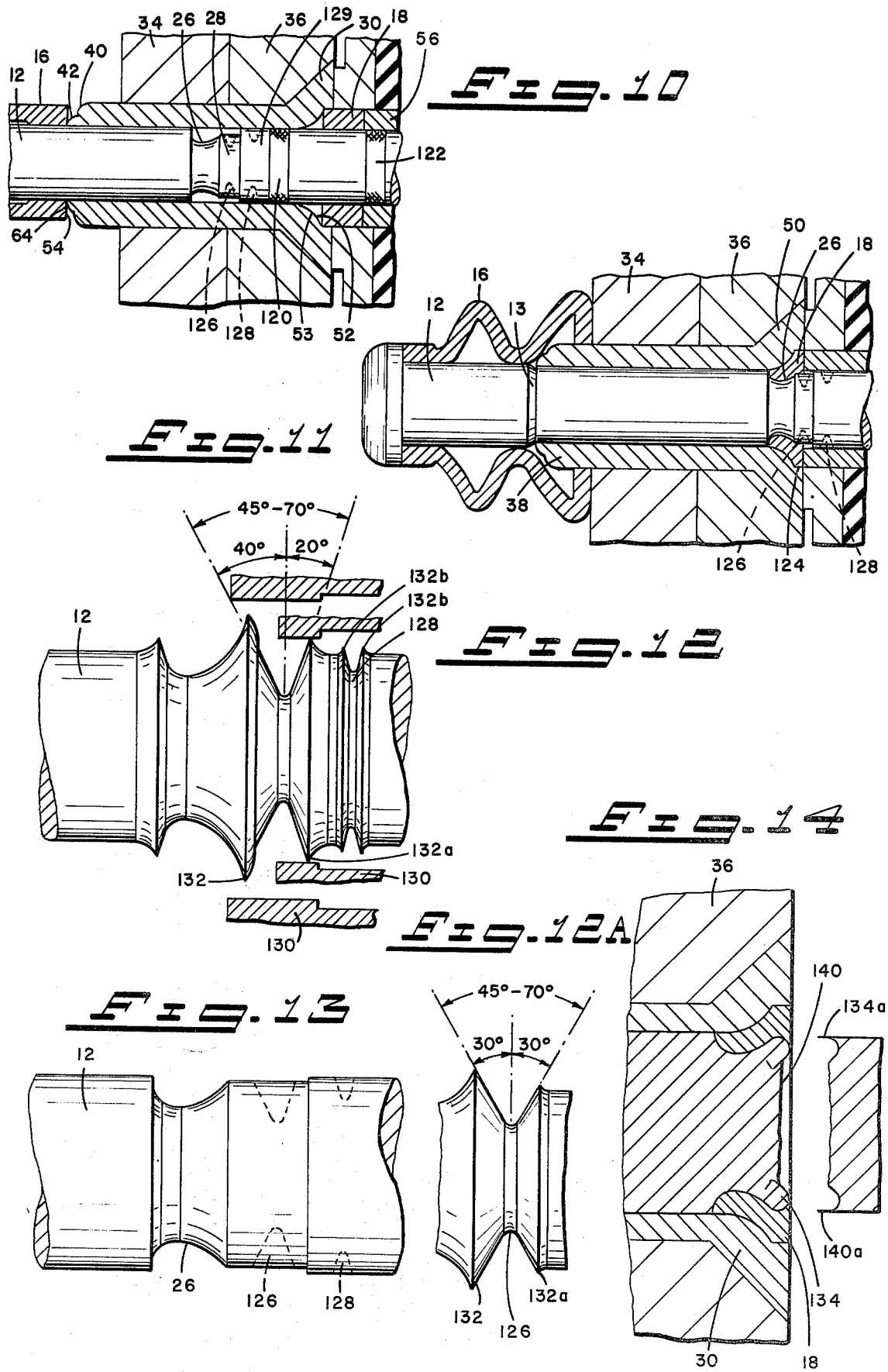

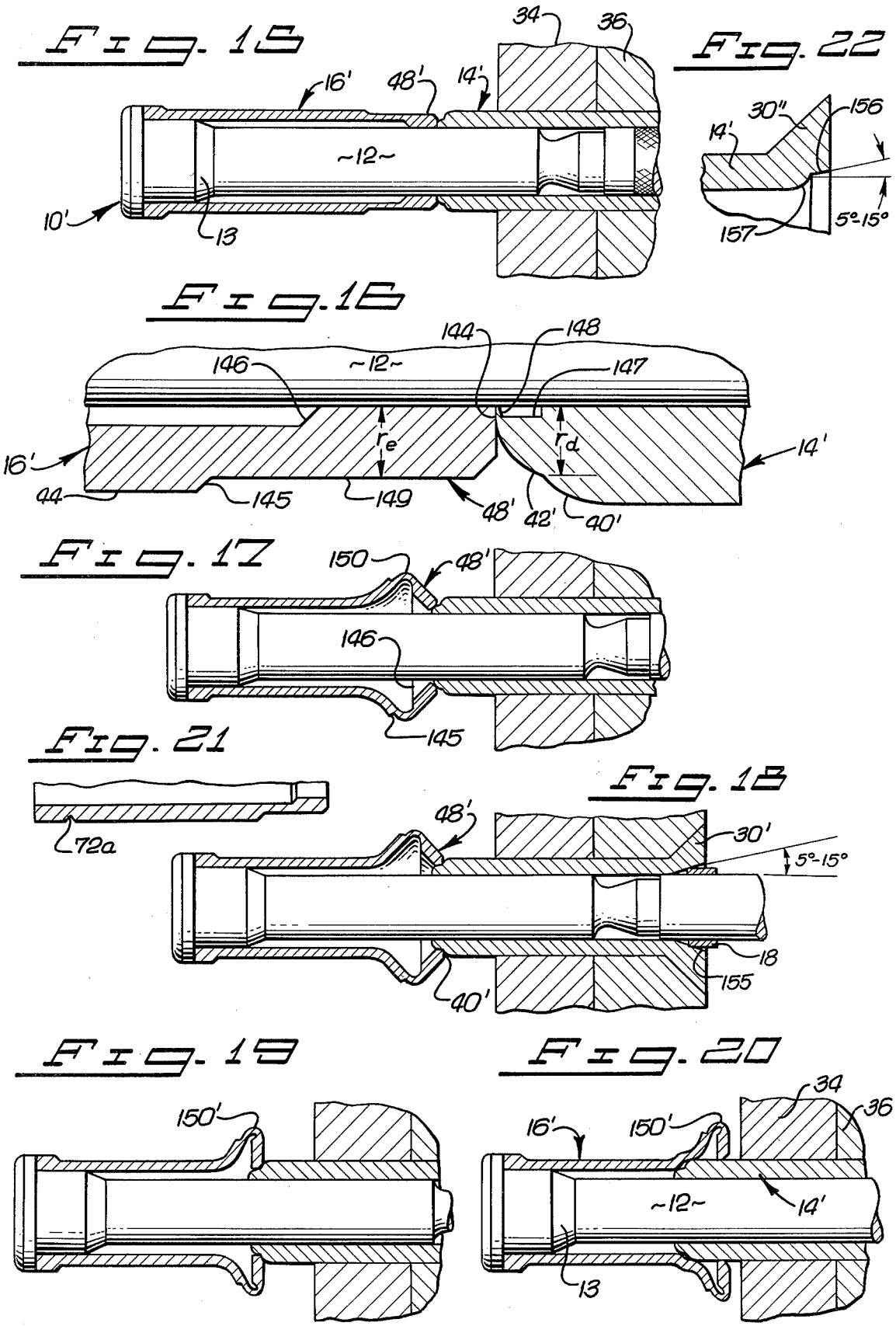

BLIND RIVET ASSEMBLY

BACKGROUND OF THE INVENTION

This is a continuation-in-part of the inventor's U.S. patent application, Ser. No. 037,635 filed May 11, 1979, now abandoned.

FIELD OF THE INVENTION

The present invention relates to blind fastener assemblies, and more specifically, to a blind rivet assembly having a buckle sleeve.

PRIOR ART

Blind rivets are well known in the prior art and are used to fasten components when only one side of the workpiece is accessible. Such type of rivets generally comprise three pieces: (a) a stem or mandrel having a bulb-forming head at one end and serrations at the other end for engagement by a pulling tool, (b) a tubular body surrounding the mandrel and having a flanged head, and (c) a locking collar encircling the mandrel near the body head. In use, the head portion of the mandrel and the surrounding body together are inserted through a hole in the workpiece. A riveting tool including a pulling head is used to translate the mandrel axially away from the workpiece. During such translation, the bulb-forming elements of the mandrel head expand the rivet body laterally to form a "blind bulb" on the hidden side of the workpiece. The pulling head then forces the locking collar into a groove in the mandrel to lock the headed, accessible end of the body to the stem. Finally, the stem portion of the mandrel extending from the workpiece is broken off to complete the installation.

Recently a four-piece "ripple sleeve" type rivet assembly has been devised which provided certain advantages in blind fastener assemblies. In the ripple sleeve configuration, the sleeve and rivet body are specifically configured such that as the mandrel is pulled through the workpiece, the rivet sleeve begins to slide and expand laterally over the tapered tail portion of the body member without any bulb formation until the forward end of the sleeve engages the workpiece. However, a number of problems exist with such type of assembly. More specifically, the rippling action on which bulb formation and propagation depend has proved to be difficult to control. Moreover, the sleeve makes initial contact with the workpiece over a narrow region immediately around the edge of the hole exerting high pressure and tending to extrude into the gap between the workpiece and the shank portion of the rivet body. While such a configuration may prove useful in connection with certain materials and in certain stress situations, there is a long felt need for a fastener assembly which could produce a substantially reduced stress on a structure made of synthetic material, thereby not impairing the integrity of the structure. This is especially significant in aerospace applications which are now using a wide range of newly developed different materials and which must be joined in a specific manner. Furthermore, to the above shortcomings, it is believed that a ripple sleeve type fastener assembly is susceptible to a reverse folding sequence, thus substantially weakening the workpieces so joined. Furthermore, the ripple sleeve rivet requires a complex tail geometry on the rivet body requiring expensive secondary manufacturing operations on the excessively long tail end of the body member. Given the fact that simplicity and weight are of special importance in the aerospace industry, there is a need for a blind fastener assembly which has these attributes.

The present invention overcomes the above-referenced problems and provides a means for joining pieces together such that improvements in strength and in integrity are achieved. In addition, the blind fastener assembly of the present invention is relatively straight forward in its configuration, light weight, and easy to install utilizing conventional equipment.

SUMMARY OF THE INVENTION

When a strong axially force is exerted on the end of a hollow cylinder so as to put it under compression, the compressed column will buckle outwards at some random location around the cylinder. If the cylinder wall is of uniform thickness, buckle finally results in a radially projecting flange around the circumference. This flange is generally skewed, but by the use of the specific configuration of the present invention, an annular flange is obtained having a certain, predetermined configuration. In the past, blind rivets were not able to achieve a reliable control for the buckle. However, the present invention utilizes a stepped, hollow cylindrical buckle sleeve having two different wall thickness portions arranged such that buckle will occur at the circumferentially uniform divide between the two wall thickness portions with the resultant flange being partially made up of the entire length of the thicker wall portion on one side, and of an adjoining roughly equal, length increment from the longer and thinner wall portion of the cylinder on the other side of the flange.

The present invention is directed to a blind rivet fastening assembly which has a specific configuration such that controlled buckling is achieved. The buckling sleeve member as broadly described above, is a long, hollow cylinder and can come in a variety of different configurations. Preferably, a configuration which has two different thicknesses is used; more specifically, a two-stepped model which has a centrally spaced thinner wall portion separating two thicker end portions. A step or shoulder is formed on the outside surface separating the thinner wall portion and the thicker wall portion at one end, and a deep counter bore produces a step or shoulder on the inside surface separating the thinner wall portion from the other thicker end portion.

The rivet body is designed with a tail section which aids in controlling the buckling of the sleeve member. The tail section is configured so as to minimize problems due to eccentricity of the bores in the sleeve and the rivet body and to assure a fully developed primary buckling of the sleeve prior to any contact with the workpiece.

In addition to improvements in the buckle sleeve and the rivet body, the assembly of the present invention utilizes an improved configuration for the mandrel for separating the throw away portion of the mandrel from the section which remains so as to produce a clean, brittle fracture break instead of a cup-and-cone break of ductile fracture. The configuration of the mandrel is such that it eliminates the objectionably sharp residual burr surrounding the fracture surface found on rivets of the prior art.

Yet another improvement in the mandrel involves an element referred to herein as a "dummy notch." This dummy notch is formed adjacent to a breaknotch in such a way that the breaknotch is flanked by both the dummy notch on one side and a lock-groove for the locking collar on the other side. This enables the mandrel of the present invention to fulfill a known metallurigical condition for raising the fracture strength of the breaknotch without changing the breaknotch diameter.

The novel features which are believed to be characteristic of the invention, both as to its organization and method of operation, together with further objectives and advantages thereof, will be better understood from the following description considered in connection with the accompanying drawings in which presently preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a cross-sectional view showing one embodiment of the blind fastener assembly of the present invention.

FIG. 2 shows the embodiment of FIG. 1 in a first intermediate position.

FIG. 3 shows the embodiment of FIG. 1 in a second intermediate position.

FIG. 4 shows the embodiment of FIG. 1 wherein the buckle sleeve engages a surface of the workpiece.

FIG. 5 shows the embodiment of FIG. 1 in the finally formed condition.

FIG. 6 shows a second embodiment of the rivet body of the present invention.

FIG. 7 shows a third embodiment of the rivet body of the present invention.

FIG. 8 shows a fourth embodiment of the rivet body of the present invention.

FIG. 9 shows both primary and secondary buckling of the fourth embodiment of the present invention.

FIG. 10 is an enlarged view of the tail section of the rivet body of the first embodiment of the present invention.

FIG. 11 is an enlarged view of the first embodiment of the present invention prior to the throw away end of the mandrel being removed.

FIG. 12 shows the formation of hidden notches in the stem shank section of the mandrel of the present invention.

FIG. 12A an alternate configuration for the breaknotch.

FIG. 13 also shows the hidden notches formed in the tail section of the mandrel of the present invention.

FIG. 14 shows the formation of the fracture in the mandrel of the present invention.

FIG. 15 shows a cross-sectional view of another embodiment of the blind fastener assembly in accordance with the present invention.

FIG. 16 is an enlarged view showing the rear end of the rivet body and the forward end of the separate buckle sleeve of the embodiment of FIG. 15.

FIGS. 17-20 show consecutive steps of buckle formation during installation of the blind fastener assembly of FIG. 15. FIG. 18 also shows an improvement to the recess geometry in the manufactured head of the body member.

FIG. 21 shows an alternative buckle sleeve configuration.

FIG. 22 shows another rivet body manufactured head configuration.

DETAILED DESCRIPTION OF THE INVENTION

Referring first to FIGS. 1-4, the first embodiment of the improved blind fastener assembly of the present invention is shown. The fastener assembly 10 includes a generally solid rod-shaped mandrel 12, a tubular rivet body 14, a buckle sleeve 16 and a locking collar 18. The mandrel 12 is slideably disposed in the body 14 and sleeve 16, with the sleeve 16 at one end of body 14 and the locking collar 18 at the other end thereof.

The mandrel 12 has an enlarged or flared stem head 20 at one end thereof formed on a first section 12a. Head 20 is configured to circumferentially engage sleeve 16. An intermediate section 12c of mandrel 12 forms a shoulder 13 with section 12a, and a plurality of pulling members 22 shown in phantom line are located adjacent the other end 12b thereof. Pulling members 22 are configured to be engaged by an associated pulling tool 24 such as that illustrated and described in U.S. Pat. No. 3,915,055. It is to be understood, however, that a wide variety of pulling members and associated pulling tools are within the scope of the present invention. Mandrel 12 also has an inwardly extending groove 26 of reduced cross-sectional diameter, compared with sections 12a, 12b and 12c into which locking collar 18 is forced as hereinbelow described. Adjacent the groove 26 is a breaknotch section 28 which is configured such that section 12b of the mandrel can be separated as also hereinbelow described.

Rivet body 14 has a generally tubular configuration and includes an enlarged head 30 adjacent one end thereof, an intermediate shank portion 32, and a tail section 38 adjacent the other end thereof. Tail 38 is specifically designed so as to engage the buckle sleeve 16. In the preferred embodiment, the shank portion 32 extends through aligned openings in a pair of workpieces 34 and 36. More specifically, the tail section 38 of the body 14 is formed, in the first embodiment, of two arched sections 40 and 42. As one can see, arched section 40 has a somewhat larger diameter than arched section 42.

The buckle sleeve 16 has a generally tubular configuration and includes a central thin walled section 44, a first thicker end section 46 and a second thicker end section 48. End sections 46 and 48 are configured to form external and internal shoulder areas adjacent each end of the buckle sleeve 16. While not to be limited to any specific method of construction, the internal ledge of shoulder 60 adjacent end 48 can be made by boring out the sleeve 16 such that the diameter of the sleeve 16 is smaller adjacent the rivet body 14. The external ledge or shoulder 72 adjacent section 46 can be made by trimming the sleeve 16 so as to remove material from the outer surface thereof. Note that end 54 of sleeve 16 abuts directly against tail 38 in an end-to-end configuration.

To install the first embodiment of the blind fastener assembly 10 of the present invention in a pair of workpieces 34 and 36, a hole is drilled through workpieces 34 and 36. The hole in workpiece 36 is countersunk at area 50. Assembly 10 is then inserted as one can see. The hole through the workpieces 34 and 36 is large enough to permit the stem head 20 of the mandrel 12 as well as the buckle sleeve 16 to pass therethrough. The rivet body also passes through the opening, but is retained by the enlarged head 30 which engages the countersunk area 50 in workpiece 36. Alternatively, for protruding head style rivets the countersink is unnecessary. Other means for limiting the travel of assembly 10 through the workpiece is also within the scope of this invention.

An axial force is exerted on mandrel 12 by means of pulling tool 24. More specifically, the pulling tool 24 engages the pulling member 22, as illustrated and described with reference to FIGS. 3-5 of U.S. Pat. No. 3,915,055, for example. This technique and the associated tool are conventional and thus a more detailed description of how an axial force is applied to the mandrel 12 will not be set forth in any great detail herein. One can see, however, that a region 24a of the pulling tool 24 bearing upon the enlarged head 30 of the rivet body 14 serves mainly to contain the locking collar 18 which bears the reaction force transmitted through the tool anvil 56 during pulling of the mandrel 12. The cylindrical anvil member 56 within the tool 24 also provides an axial force on locking collar 18, thus forcing it against a tapered surface 53 and into recess or cavity 52 of the rivet body 14.

Referring to FIG. 1, one can see the assembly 10 disposed through workpieces 34 and 36, prior to any forces being applied. As is shown, mandrel 12 extends through both workpieces 34 and 36 such that end 12b is gripped by the pulling tool 24. As mandrel 12 is advanced axially by pulling tool 24, the second end section 48, and more specifically end 54 of the buckle sleeve 16, is caused to press against arched section 42 of tail section 38. Further advancement of the mandrel 12 through the workpieces 34 and 36 as shown in FIG. 2, causes an outward buckling of the buckle sleeve 16 to occur adjacent the second end section 48 thus forming a first outwardly extending annularly shaped buckle 58. This buckling is encouraged by the differences in thickness between second end section 48 and intermediate section 44. Thus, buckle 58 is found adjacent shoulder 60 as seen in FIG. 2. Note that buckle 58 is formed of the entire length of the thicker end section 48 and a roughly equal length increment of the thinner walled section 44.

Continued advancements of the mandrel 12 through the body 14, as shown in FIG. 3, causes the buckle 58 to flex further axially outward from the mandrel 12 so as to form a generally flat surface 62. As illustrated in FIG. 4, further advancement of the mandrel 12 causes the buckle sleeve 16 to flex further outward and to slide outwardly over the first and second sections 40 and 42 and down the rivet body 14 thereby engaging workpiece 34. In this manner, generally flat surface 62 contacts the workpiece 34. Because of this fact, problems of point pressure associated with ripple sleeves are substantially eliminated. This means that materials such as ceramics, plastics, as well as metals and the like can be used as workpieces 34 and 36.

Referring now to FIG. 5, the mandrel 12 has been pulled through the workpieces 34 and 36 such that shoulder 13 is caused to abut against the tail 38 of the rivet body 14 simultaneously as lockgroove 26 comes into alignment with cavity 52 and the collar is stuffed. This limits the travel of the mandrel 12 and further extraction of mandrel 12 causes the distal end 12b to break off as hereinbelow described. As one can see, in the preferred embodiment a second buckle 70 is formed in the buckle sleeve 14 adjacent the shoulder 72 so as to form a trough 74 between buckle 58 and buckle 70. Uniformity of buckle 70, as described above, is encouraged by placement of shoulder 72 adjacent thin walled section 44.

By the use of the configuration of the first embodiment of the present invention, problems of eccentricity of bores in both the buckle sleeve 16 and the rivet body 14 are overcome. Bore eccentricity results in a blind head which lacks roundness and may only be partially seated against the workpiece. In extreme cases, a crooked blind head will be such as to prevent the slide of sleeve 16 into contact with the associated workpiece. However, by the use of the assembly 10 of the present invention, this is substantially overcome. Thus, a very stable, final configuration (FIG. 5) results which produces a symmetrical and very strong blind head 76 with minimal pressure on the composite material of workpiece 34. This is achieved by three processes which occur more or less simultaneously during the formation of buckle 58; to wit: rotation, pivoting and slide. Bore eccentricity causes these processes to develop at nonuniform rates around the periphery of the mating end of the buckle sleeve 16 with differential rates of slide being the most problematic of the three processes. To control the slide problem, a "stepped" form is designed into the tail section 38 of the body 14. The depression or step is formed between the two domes or arcs 40 and 42. The step serves to ensure that portions of the buckle sleeve 16 adjacent section 48 do not exhibit early slide over body 14 until the other lagging portions of section 48 catch up. Thus, the slide of sleeve 16 is temporarily stopped while the other two processes, rotation and pivoting, continue until the buckling wall of the buckle sleeve 16 rotates through an angle equal to or greater than 90 degrees as shown in FIG. 3. Under the deformative force of installation, the mating end surface 54 of section 48 of sleeve 16 which is somewhat malleable, takes on the shape of the double arch of sections 40 and 42 on the tail 38 of body member 14. This shape is indicated in FIG. 4 as grooves 64.

When the resulting symmetry obtained by the delay of slide is completed, the slide process is resumed in a uniform manner until the broad face or surface 62 of the blind head 76 makes contact with the workpiece at area 66 as shown in FIG. 4. Distribution of the force of contact over the broad footprint of the contacting surface 62 allows for a low pressure in pounds per square inch making it relatively impossible to damage the workpiece 34 and/or 36.

While the stepped radius form for the tail 38, as shown in FIG. 4, is preferred, other configurations for tail 38 are also within the scope of the present invention.

Reference is now made to FIG. 6 in which a second alternate configuration for the tail section 38 is shown. In this configuration, rivet body 80 has a first annular section 82 a second annular section 84 joined by an intermediate section 86 thereby forming a step therebetween. Mandrel 81 extends through the rivet body 80 and the buckle sleeve 88 as in the first embodiment of the present invention. The formation of a step between the first and second sections 82 and 84, respectively, also prevents problems of eccentricity as discussed hereinabove. In this manner, end 92 formed on the thicker section 90 engages the second annular section 84 and causes the buckle sleeve 88 to flex outwardly therefrom as the mandrel 81 is withdrawn. As the sleeve section 90 buckles outward from the mandrel 81, it will remain in the step region 85 until the configuration of FIG. 3 is achieved. Ultimately, an outwardly extending section or buckle is formed which is caused to engage the workpiece 34.

In FIG. 7 a third variation is shown. In this embodiment, the rivet body 94 and buckle sleeve 88 are formed with mandrel 95 passing therethrough. The rivet body 94 has a generally round or convex arched top 96 terminating in an arched concave section 98. The thicker section 102 of sleeve 100 adjacent end 104 would initially be disposed on top 96. As the mandrel 95 is withdrawn, sleeve 100 would buckle outward and slide down adjacent the workpiece 34 as shown in FIG. 7. While this configuration is not believed to be as effective in controling eccentricity as the first embodiment, a good "footprint" with workpiece 34 is still achieved.

Referring now to FIG. 8, one can see a fourth embodiment for the rivet body 106. In this embodiment, body 106 is formed with a first round section 108 and a second inclined section 110 extending outwardly therefrom. Buckle sleeve 112 would initially mate with section 108. Continued withdrawal of mandrel 118 would thus result in the buckle formed as in FIG. 8 where a single fold and much extension of the body tail beyond the workpiece's inaccessible surface 34 indicating that minimum grip installation is achieved. By the same logic in FIG. 9, the double fold and little body tail protrusion indicate maximum grip installation. The stepped shoulder 72 serves to limit the region of buckling and to obtain symmetry of the second folding. In another alternative of the buckle sleeve as shown in FIG. 21, the shallow notch 72a on the uniform outer wall serves the same function as shoulder 72.

Referring now to FIGS. 10-14, the fracturing of section 12b of the mandrel 12 from section 12c is illustrated. Referring first to FIG. 10, one can see that the mandrel 12 has progressed through the rivet body 14. When the mandrel 12 has been further withdrawn, as in FIG. 11, shoulder 13 is engaged by the tail 38 such that further withdrawal of mandrel 12 is initially prevented. Simultaneously, the spring loaded tool shroud 24a around the locking collar 18 allows the tool anvil 56 to move in the opposite direction of mandrel travel causing the collar 18 to be stuffed into the now adequate void provided by alignment of the mandrel lockgroove 26 and the recess 52. Further pull on the mandrel 12 encourages fracture at a first hidden groove or breaknotch 126 preformed in the breaknotch section 28. Prior art rivets which used this type of concealed breaknotch on the mandrel exhibited a sharp, forward pointing knife edged burr peripherally formed around the fracture surface, giving possible rise to both pre-installation and post installation problems. The former problem usually shows up as premature stem fracture since the forward pointing burr tends to gore into the locking collar as the mandrel advances. As a result, the prior art stem may break below the workpiece surface and the locking collar may not be properly stuffed. In the event that acceptable break and collar stuffing are obtained, the latter problem appears as an objectionably sharp burr protrusion above the workpiece surface. Not infrequently, this knife edge protrusion has to be removed by a secondary shaving operation which adds expense to the installation process. Secondly, shaving may be possible on aircraft skins made from metals, however shaving can be very damaging for new generation skins made from graphite/epoxy composite materials.

It can be seen in FIG. 14 that the present invention eliminates the sharpness from the burr 134 surrounding the fracture surface 140. This is achieved by a unique manufacturing process referred to as a reversal of roll form. More specifically, the form which appeared on the throwaway portion of the stem on prior art is now incorporated on the retained portion of the stem 12c of the present invention. As shown in FIG. 14, the sharp burr and cup shape 134a now appear on the throwaway pintail portion 12b of the mandrel 12. More acceptable alignment between the rounded burr surface 134 and the fracture surface 140 results from the improved manufacturing operation.

FIG. 12 explains this improvement in the product and related manufacturing operation by showing the breaknotch angles and shoulder burr rolling sequence. Prior art reversed the location of the 40/20 degree angles of the breaknotch form as shown. In the present invention, by incorporating the larger 40 degree angle on the lockgroove 26 side of the notch 126 containing the first radially larger annular burr 132, the root of the notch 126 where fracture is to occur is initially separated from centerline of the notch a greater distance than that which would be realized from the smaller 20 degree angle. Under burr flattening pressure, the larger burr 132 tends to elongate axially across the breaknotch 126 and to overrun beyond the centerline of the notch 126. However, the arrangement of the angles as shown in FIG. 12 assures less overrun than if the angles were reversed so that in the final run there is better alignment between the burr periphery and the fracture surface. Instead of using dissimilar angles, a symmetric notch with 30 degree angles on each side as shown in FIG. 12a is still in keeping with this improvement, and the workable range of values for the included notch angle is 45 degrees to 70 degrees.

Concerning burr flattening sequence, in the past, this was done with a pair of flat tools 130 and the mandrel was rolled between them. The tools were arranged such that the higher burr 132 was flattened before the lower burr 132a; the first burr 132 flattened thus spanning the notched orifice 126 with a sharp leading edge and with a rounded cavity beneath. However, in the present invention, the lower burr 132a is deliberately flattened first as shown in FIG. 12 causing the sharp leading edge and the rounded undercavity 134a to appear on the throwaway pintail portion 12b of the mandrel 12 as seen in FIG. 14. Subsequent flattening of the higher burr 132 forces it to flow into the undercavity 134a, beneath the previously flattened lower burr 132a, with the rounded form 134 remaining on the useful portion 12c of the mandrel 12 after fracture. Thus sharpness and excessive protrusion are eliminated making a secondary shaving operation unnecessary. The stepped face rolling tools 130 shown in FIG. 12 press the sparse material contained in the smaller burr 132a below the mandrel diameter to make sure that the sharp burr and undercavity are formed on the throwaway pintail portion 12c of the mandrel 12. Travel of the mandrel 12 through tools 130 causes third and fourth burrs 132b to form the second hidden notch 128.

FIG. 13 shows the finished view of the region at the end of the rolling operation. Observe that both the dummy notch 128 and the breaknotch 126 are concealed and the lockgroove 26 alone remains open. The slightly reduced diameter at the region of the concealed breaknotch 126 lowers the frictional drag against the lockcollar 18 facilitating slide into the lockgroove 26 without aggravating premature stem break problems.

Finally, with respect to the dummy notch 128, it is a known principle that auxiliary notches imposed on the two sides of a test notch, raise the strength level at which the test notch will fail. One such auxiliary notch is provided by the lock groove 26 so that a dummy notch 128 on the other side of the break notch 126 fulfills the criteria for raising the fracture strength for a given break notch diameter. With this improvement maximum possible strength is extracted from the mandrel 12 to resist any tendency toward premature stem break while retaining a small enough breaknotch diamter to restrict a clean fracture to the root of the breaknotch 126 without carrying away a portion of the lockgroove shoulder with the fracture.

Another improvement of the assembly 10 of the present invention relates to the configuration of the countersunk portion 50 in workpiece 36 and the associated enlarged head 30 of body 14. In the preferred embodiment, a slightly tapered, shallow counter bore 124 (see FIGS. 10 and 11) in the head 30 of rivet body 14 serves to confine locking collar 18 and also serves to conceal the slightly projecting rounded burr 134 thus eliminating any protrusion above necessary flushness limits associated with aerospace technology.

Having thus described several embodiments of the present invention, it should therefore be understood that other changes and modifications can be made without departing from the true scope and spirit of this invention as recited in the appended claims. For example, in the preferred embodiment, mandrel 12 has knurled section regions 120 and 122 formed along the length thereof. One of these knurled regions 120 within the body member 14 provides friction to hold the preassembled rivet components against inadvertent disassembly during handling or installation and the other exposed knurl 122 prevents the locking collar 18 from inadvertently falling off the mandrel 12 before installation.

Yet another embodiment 10' of the inventive "buckle bolt" blind rivet assembly is shown in FIGS. 15 through 20. There, the mandrel 12 has the same configuration as in the earlier embodiments, and the rivet body 14' has substantially the same double arched or double domed configuration as in the embodiments of FIGS. 1–5, 10, and 11. As an option, the end dome may have a small flat 144 against which the buckle sleeve abuts. The buckle sleeve 16' is similar to the sleeve 16 shown in earlier embodiments, but now is provided with an outer step 145 in addition to an inner step 146 near the forward or buckle forming end 48' of the buckle sleeve.

Advantageously, but not necessarily, a small counterbore 147 may be formed in the end of the rivet body 14' beneath the first or end dome 42'. As that dome is formed during the manufacturing process, a burr 148 may be produced at the leading edge of the counterbore 147. If the counterbore 147 were not present, this burr might extend into the the forward opening of the rivet body 14' and interfere with the initial assembly of the rivet body onto the mandrel 12. The counterbore 147 eliminates this potential problem.

Advantageously the radial thickness $r_e$ of the forward end 48' of the buckle sleeve 16' (FIG. 16) is greater than the base thickness $r_d$ of the first or end dome 42' on the rivet body 14'. This aids in assuring that initial partial buckle formation will occur while the end 48' of the sleeve 16' is still abutting against the end dome 42'.

Preferably, the outer step 145 is situated slightly "behind" or further away from the forward end 48' of the buckle sleeve 16' than the inner step 146. The outer step 145 is formed by reducing the outside diameter of the buckle sleeve 16' in a region 149 extending from the forward end of the buckle sleeve to the location of the step 145. From there rearward, the buckle sleeve 16' has a thicker outside diameter corresponding to the central walled section 44 in the earlier embodiments. Some typical dimensions for an illustrative "buckle bolt" assembly 10' are as follows:

Mandrel diameter: 0.133 inch
Rivet body inside diameter: 0.136
Rivet body 14' maximum outside diameter: 0.190
End dome 42' base thickness $r_d$: 0.017
Counterbore 147 inside diameter: 0.142
Length of counterbore 147: 0.015
Buckle sleeve end radial thickness $r_e$: 0.022
Buckle sleeve 16' forward end inside diameter: 0.134
Buckle sleeve forward end 149 outside diameter: 0.177
Distance of inner step 146 from buckle sleeve forward end: 0.050
Inside diameter of buckle sleeve rearward of inner step 146: 0.147 inch
Distance of outer step 145 from buckle sleeve forward end: 0.070
Outside diameter of buckle sleeve at location of wall section 44: 0.183

The double step arrangement of the sleeve 16' aids in pre-formation of the buckle prior to contact with the workpiece 34, 36. This stepped buckle formation is shown in FIGS. 17 through 20.

As the mandrel 12 initially is pulled during the installation process, a partial buckle 150 begins to form while the forward end 48' of the sleeve 16' is still abutting against the first or end dome 42'. This is aided slightly by a tendency of the forward end 48' to bite into the counterbore 147 as buckle formation first begins. The buckle 150 itself forms at a region between the inner step 146 and the outer step 145. The presence of these two steps substantially eliminates nonuniformity or skewing of the buckle being formed. That is, the buckle radius at any particular time during buckle formation is uniform around the entire periphery of the sleeve 16', and is also uniformly spaced from the forward end of the buckle sleeve.

After the buckle 150 has partially formed as shown in FIG. 17, continued pulling of the mandrel 12 results in the sleeve end 48' sliding up toward and abutting against the second dome 40', as shown in FIG. 18. The second dome provides additional resistance so that as the mandrel 12 is pulled further, bulb or buckle formation is essentially completed, as shown in FIG. 19. The second dome also prevents flaring or radial spreading of the forward end of the buckle sleeve.

As the mandrel 12 is pulled even further, the now essentially completely formed buckle 150' slides over the the second dome 40' and advances along the outside of the rivet body 14' (as shown in FIG. 20) until it comes in contact with the workpiece 34, 36. Preformation of the buckle results in broad area contact with the workpiece, making the inventive blind rivet especially useful with composite workpiece materials such as graphite/epoxy. Unlike the prior art, there is no initial contact of the workpiece by the forward end of the buckle sleeve, following by rotation of that end as the blind bulb is formed. Such prior art blind bulb formation tended to gouge the workpiece, and thus was particularly damaging to a graphite/epoxy matrial. Although not shown, installation is completed when the shoulder 13 contacts the end of the rivet body 14' and the locking collar 18 is inserted into the lock groove 26 (similar to FIG. 5). Finally, the projecting end of the mandrel 12 is broken away.

In another embodiment, illustrated in FIG. 18, a counterbore 155 is provided in the enlarged or "manufactured" head 30' of the rivet body 14'. This counterbore has a slightly tapered or conical configuration, preferably with an angle in the range of 5 degrees to 15 degrees and with the wide end facing toward the end of the mandrel 12 that is being pulled. In a preferred configuration shown in FIG. 22 the manufactured head 30'' has a tapered counterbore configuration in which a conical tapered locking collar insertion aiding section 156 leads to an arcuate portion 157. Again, the preferred angle for the tapered section 156 is between 5° and 15°.

The counterbore 155 (FIG. 18) or 156 (FIG. 22) conceals the burr 134 (FIG. 14) on the mandrel after installation. Moreover, the tapered configuration ensures that during installation the locking collar 18 will be smoothly inserted first within the rivet head 30' or 30'' and ultimately, into the lock groove 26. Prior to installation the locking collar 18 may in fact not be situated within the counterbore 50'. In this preinstallation condition, the locking collar 18 is retained on the mandrel by the knurl 122. At the beginning of installation, the pulley tool 24 will press axially against the locking collar 18. If the counterbore 155 is slightly eccentric, or if there is a slight burr at the counterbore leading edge or at the leading edge of the locking collar itself, the locking collar may not smoothly enter into the counterbore, thereby impeding or preventing proper rivet installation. However, by employing a slight entry angle, such as that illustrated in FIG. 18 in the range of from 5 degrees to 15 degrees, when axial force is applied to the locking collar 18, it will smoothly enter into the counterbore 155 without any tendency to stop or become hung up in the event of a burr or eccentricity. Smooth, radially uniform installation is assured.

In the alternative buckle sleeve configuration of FIG. 21 a notch 72a serves the same limiting function as that provided by the shoulder 72 in the embodiment of FIGS. 1 through 9.

I claim:

1. A blind rivet assembly of the type having a mandrel with an enlarged head at one end, and having a rivet body and a separate buckle forming sleeve disposable about said mandrel with the rear end of said buckle sleeve against said enlarged head and the forward end of said buckle sleeve abutting against the rear end of said rivet body, said assembly being useful for fastening a workpiece from one side thereof, the improvement wherein:

the rear end of said rivet body has a double domed configuration including an end dome extending forwardly from said rivet body rear end and having a minimum diameter at said rear end and a maximum diameter where the end dome terminates and a second dome begins, said second dome extending with increasing diameter forwardly from the termination of said end dome, said buckle sleeve having a central walled section and having a forward end section which abuts against the end dome of said rivet body, the inner diameter of said central wall section being greater than the inner diameter of said forward end section so that there is an internal shoulder at the rear of said forward end section, the radial thickness of said forward end section being greater than the radial thickness of said central walled section, the length of said rivet body being greater than the thickness of said workpiece, so that during installation, as said mandrel is translated forwardly while counterforce is exerted axially rearwardly on said rivet body, said buckle sleeve will begin to buckle while said forward end section is still abutting against said rivet body first dome, said buckle initially forming in the vicinity of said internal shoulder, continued mandrel translation causing said buckle sleeve to slide over said end dome into abuttment with said second dome, the increased resistance of said second dome to forward movement of said buckle sleeve resulting in continued buckle formation as said mandrel is translated further forward, so that said buckle is substantially completely formed against said second dome, further continued forward translation of said mandrel causing said substantially fully formed buckle to expand over said second dome and to translate axially along the exterior of said rivet body into firm abutting relationship with said workpiece.

2. A blind rivet assembly according to claim 1 wherein the inner diameter of said buckle sleeve forward end section is substantially the same as the inner diameter of said rivet body, each of said inner diameters being slightly greater than the outer diameter of said mandrel.

3. A blind rivet assembly according to claim 1 wherein the outer diameter of said buckle sleeve forward end section is less than the outer diameter of said central walled section so that there is an external shoulder at the rear of said forward end section, said external shoulder being situated a greater distance further from the forward end of said buckle sleeve than is said internal shoulder, said buckle initially forming in the region between said internal shoulder and said external shoulder.

4. A blind rivet assembly according to claim 1 wherein a shallow counterbore is provided at the interior of the rear end of said rivet body, beneath said end dome.

5. A blind rivet assembly for use in joining an associated workpiece together, comprising a mandrel, a buckle sleeve, a separate rivet body and a locking collar, said buckle sleeve, rivet body and locking collar slideably disposed and circumferentially surrounding said mandrel with said buckle sleeve disposed adjacent one end of said body and said mandrel extending through said body and beyond the other end thereof, and wherein:

said mandrel has a locking groove to receive said locking collar upon installation of said rivet, said buckle sleeve has a cylindrical body having varying thicknesses along the length thereof and is abutted against said mandrel such that when said sleeve is subjected to a pulling force by said mandrel, said sleeve buckles outwardly from said mandrel prior to engaging said associated workpiece, said rivet body has a stepped end configured to engage said buckle sleeve and a flared end configured to receive said locking collar, and said locking collar is configured to extend into said rivet body flared end and engage said locking groove on said mandrel, and wherein:

each end of said buckle sleeve is thicker than the central section thereof, and a shoulder is formed on the inner surface of said buckle sleeve adjacent to that end which engages the separate rivet body with the inside diameter of that end being less than the inside diameter of the adjacent central portion of said buckle sleeve cylindrical body.

6. A blind rivet according to claim 5 wherein the end of said rivet body adjacent said buckle sleeve has a pair of stepped arced sections.

7. In a rivet assembly of the type having a a mandrel axially disposed through an associated buckle sleeve and a separate rivet body, said mandrel having an enlarged head at one end thereof for engaging the rear end of said buckle sleeve and means for joining a pulling tool formed on a removable section at the other end thereof, the improvement useful for accomplishing substantially complete blind buckle formation in said buckle sleeve prior to contact with an associated workpiece during installation of said fastener, wherein:

said buckle sleeve has a cylindrical body including a central thin walled section and a forward end which abuts against said separate rivet body in an end-to-end configuration, said forward end having a greater radial thickness and a smaller inner diameter than the adjacent portion of the central thin walled section, there being an inner shoulder in said buckle sleeve between said forward end and said adjacent portion, such that as said mandrel is pulled through said rivet body, said buckle sleeve forms near said inner shoulder an outwardly extending annularly shaped buckle configured to make a generally flat contact with said associated workpiece, the rear end of said separate rivet body which abuts against said buckle sleeve having a shaped end configured to encourage said buckle sleeve to form said outwardly extending buckle while simultaneously helping to limit eccentricity in said buckle, said shaped end including sequential first and second stepped surfaces each having increasing diameter with increasing distance from said rivet rear end, the incline of said second stepped surface being abruptly greater than said first stepped surface at the intersection between said stepped surfaces, so that as said mandrel is pulled through said rivet body, axial movement of the buckle which is partially formed while the forward end of said buckle sleeve abuts against the first stepped surface will be impeded by the second stepped surface sufficiently so that buckle formation will be substantially completed while said buckle sleeve forward end abuts against said separate rivet body second stepped surface.

8. A blind rivet assembly according to claim 7 wherein said assembly further includes a locking collar, and said mandrel has a locking groove which receives said locking collar during installation of said assembly, and comprising the further improvement wherein:

said mandrel has a breaknotch formed adjacent said locking groove, said breaknotch being configured to aid in the formation of a clean break between said removable section and the remainder of said mandrel, said breaknotch being formed from two angled sections, the angle of the first section being approximately 40 degrees and the angle of the second section being approximately 20 degrees, said first section being closest to said locking groove, and the range of values for the included angle of the breaknotch being 45 degrees to 70 degrees.

9. A blind rivet assembly according to claim 8 wherein instead, the angle of the first and second section each is approximately 30 degrees, and the range of values for the included angle of the breaknotch is 45 degrees to 70 degrees.

10. A blind rivet assembly according to claim 7 wherein said mandrel includes an annular peripheral breaknotch configured to form a clean break between said removable section and the remainder of said mandrel, there being within said breaknotch first and second flattened burrs with said first burr being shorter than said second burr and being situated in said breaknotch above said second burr, said first burr extending from the side of said breaknotch on said removable section.

11. A blind rivet assembly according to claim 10 wherein said mandrel also has a second notch which is a dummy notch configured to raise the fracture strength of said breaknotch.

12. A blind rivet assembly according to claim 7 wherein said buckle sleeve also has an exterior shoulder formed along the length thereof, said inner and exterior shoulders encouraging buckle formation.

13. A blind rivet assembly according to claim 7 wherein said rivet body first and second stepped surfaces comprise arced sections forming a step thereinbetween.

14. A blind rivet assembly according to claim 7 wherein said rivet body first and second stepped stepped surfaces comprise inclined sections forming a step therebetween.

15. A blind rivet assembly according to claim 7 wherein said rivet body first stepped surface comprises a convex arc.

16. A method for forming a mandrel to be used in the construction of a blind rivet assembly, comprising the steps of:

(a) providing a mandrel blank having a locking groove and a plurality of outwardly extending, annular burrs, with first and second burrs forming a first notch adjacent said locking groove and second and third burrs forming a second notch, said first burr having a greater radius than said second burr, (b) flattening said second burr such that its leading edge extends partially across said first notch, (c) flattening said first burr into said first notch beneath the leading edge of said second burr thereby forming a hidden breaknotch on said mandrel configured such that upon fracture of said mandrel, sharp leading edges are formed on the throwaway portion of said mandrel, and (d) flattening said third and fourth burrs thereby forming a hidden dummy notch on said mandrel configured such that the fracture strength of said breaknotch is increased.

17. In a blind rivet assembly of the type having a mandrel, blind bulb forming components including a rivet body, and a locking collar, said mandrel being axially disposed through said components and said collar and having a peripheral locking groove which receives said locking collar during installation of said blind rivet assembly, said mandrel having a section which is removable after installation, the improvement wherein:

said mandrel has a peripheral breaknotch formed adjacent to said locking groove, and configured to aid in the formation of a clean break between said removable section and the remainder of said mandrel, said breaknotch being formed from two angled sections, the angle of the first section being approximately 40 degrees and the angle of the second section being approximately 20 degrees said first section being closest to said locking groove, the range of values for the included angle of the notch being approximately 45 degrees to 70 degrees.

18. A blind rivet assembly according to claim 17 wherein instead, the angle of the first and second section each is approximately 30 degrees and the range of values for the included angle of the notch is 45 degrees to 70 degrees.

19. A blind rivet according to claim 17 or 18 wherein said first angled section is formed with a first burr and said second angled section is formed with a second burr, said first burr being greater in diameter than said second burr, said second burr being flattened into said breaknotch, said first burr being flattened into said breaknotch beneath said second flattened burr.

20. In a blind rivet of the type having a rivet body, a mandrel and a separate locking collar, said rivet body having an enlarged head, the interior of said enlarged head being convexly curved to guide the insertion of said locking collar into a lock groove in the rivet mandrel as the blind rivet is installed, the improvement comprising:

a shallow counterbore extending inwardly from the outer end of said enlarged head to intersect with said curved interior, said counterbore having an outwardly flared entry angle in the range of from 5 degrees to 15 degrees with respect to the longitudinal axis of said rivet body, the opening end of said counterbore being slightly larger than the nominal external diameter of said locking collar, said counterbore taper assuring smooth insertion of said locking collar during installation.

* * * * *